United States Patent
Chawla et al.

(10) Patent No.: US 12,223,359 B2
(45) Date of Patent: Feb. 11, 2025

(54) COMPUTATIONAL OFFLOADS FOR COMPOSED INFORMATION HANDLING SYSTEMS

(71) Applicant: Dell Products L.P., Round Rock, TX (US)

(72) Inventors: Gaurav Chawla, Austin, TX (US); Amnon Izhar, Newton, MA (US); Walter A. O'Brien, III, Westborough, MA (US); Ali Aiouaz, Austin, TX (US); Doron Tal, Geva Carmel (IL); David L. Black, Acton, MA (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 377 days.

(21) Appl. No.: 17/569,078

(22) Filed: Jan. 5, 2022

(65) Prior Publication Data
US 2023/0214269 A1    Jul. 6, 2023

(51) Int. Cl.
G06F 9/50      (2006.01)
G06F 11/34     (2006.01)

(52) U.S. Cl.
CPC .......... *G06F 9/5044* (2013.01); *G06F 9/5055* (2013.01); *G06F 11/3409* (2013.01); *G06F 2209/501* (2013.01); *G06F 2209/5012* (2013.01)

(58) Field of Classification Search
CPC .. G06F 9/5044; G06F 9/5055; G06F 11/3409; G06F 2209/501
See application file for complete search history.

(56) References Cited

U.S. PATENT DOCUMENTS 8,099,487 B1 * 1/2012 Smirnov ............... G06F 9/5088
                                                    718/1
8,949,978 B1   2/2015 Lin et al.
(Continued)

FOREIGN PATENT DOCUMENTS

WO    2017210142 A1    12/2017

OTHER PUBLICATIONS

Anonymous: "In-situ processing—Wikipedia", Oct. 23, 2021 (Oct. 23, 2021), pp. 1-4, XP093027589, Retrieved from the Internet: URL: https://en.wikipedia.org/w/index.php?title=In-situ_processing &oldid=1051487646 [retrieved on Feb. 28, 2023] (4 pages).
(Continued)

*Primary Examiner* — Benjamin C Wu
(74) *Attorney, Agent, or Firm* — Chamberlain, Hrdlicka, White, Williams & Aughtry; Aly Z. Dossa

(57) ABSTRACT

Techniques described herein relate to a method for performing computational offloads for composed information handling systems. The method includes obtaining, by a system control processor associated with a composed information handling system, a computational offload request associated with a dataset from an application executing on an at least one compute resource set; in response to obtaining the computational offload request: identifying a dataset location associated with the dataset in the composed information handling system; identifying resources of the composed information handling system capable of performing the computational offload request; selecting a resource of the resources to perform the computational offload; and initiating performance of the computational offload request on the selected resource.

11 Claims, 11 Drawing Sheets

(56) References Cited

U.S. PATENT DOCUMENTS

| | | |
|---|---|---|
| 8,966,582 B1 | 2/2015 | Ainslie |
| 9,191,392 B2 | 11/2015 | Niemel |
| 9,686,287 B2 | 6/2017 | Manton et al. |
| 9,734,325 B1* | 8/2017 | Neumann ............. H04L 9/0866 |
| 10,707,950 B2 | 7/2020 | Martinerie et al. |
| 10,970,123 B1* | 4/2021 | Luciano ................ G06F 9/5016 |
| 11,049,349 B2 | 6/2021 | Onischuk |
| 11,113,721 B2 | 9/2021 | George et al. |
| 11,140,170 B2 | 10/2021 | Barouch et al. |
| 11,182,810 B1 | 11/2021 | Pandey et al. |
| 11,232,369 B1 | 1/2022 | Li et al. |
| 11,307,885 B1* | 4/2022 | Luciano ................ G06F 9/5088 |
| 11,320,541 B1 | 5/2022 | Cattaneo et al. |
| 11,444,955 B2 | 9/2022 | Bhandari et al. |
| 11,522,776 B1 | 12/2022 | Pai |
| 11,528,300 B2 | 12/2022 | Degioanni |
| 11,539,817 B1 | 12/2022 | Perez |
| 11,558,413 B2 | 1/2023 | Higgins et al. |
| 11,561,916 B2 | 1/2023 | Kamath et al. |
| 11,886,926 B1* | 1/2024 | Gadalin ................ G06F 9/4856 |
| 2004/0230764 A1 | 11/2004 | Merchant et al. |
| 2006/0089837 A1 | 4/2006 | Adar |
| 2010/0269109 A1* | 10/2010 | Cartales .............. G06F 9/45558 |
| | | 718/1 |
| 2011/0078242 A1 | 3/2011 | Davi et al. |
| 2011/0093471 A1 | 4/2011 | Brockway et al. |
| 2011/0106922 A1* | 5/2011 | Bouillet ................ G06F 9/5077 |
| | | 709/221 |
| 2014/0317224 A1 | 10/2014 | Resch et al. |
| 2015/0327068 A1 | 11/2015 | Hunt et al. |
| 2016/0005029 A1 | 1/2016 | Ivey et al. |
| 2016/0098297 A1* | 4/2016 | Yuyitung ............. G06F 9/5055 |
| | | 718/104 |
| 2016/0105512 A1 | 4/2016 | Richter et al. |
| 2016/0301742 A1* | 10/2016 | Lowery ................ G06F 9/5072 |
| 2016/0359872 A1 | 12/2016 | Yadav et al. |
| 2017/0031761 A1 | 2/2017 | Horan et al. |
| 2017/0093700 A1 | 3/2017 | Gilley |
| 2017/0230266 A1* | 8/2017 | Smola ................ H04L 43/0876 |
| 2017/0279690 A1 | 9/2017 | Tripathi et al. |
| 2017/0317945 A1* | 11/2017 | Guo ........................ H04L 47/83 |
| 2018/0262407 A1 | 9/2018 | Biswas et al. |
| 2018/0276632 A1 | 9/2018 | Gandevia et al. |
| 2018/0285951 A1 | 10/2018 | Borovikov et al. |
| 2019/0065256 A1 | 2/2019 | Hamilton et al. |
| 2019/0281132 A1 | 9/2019 | Sethuraman et al. |
| 2020/0027093 A1 | 1/2020 | Volk |
| 2020/0082112 A1 | 3/2020 | Altshuler et al. |
| 2020/0141827 A1 | 5/2020 | Lindman |
| 2020/0201692 A1 | 6/2020 | Kachare et al. |
| 2020/0250163 A1 | 8/2020 | Kuimelis et al. |
| 2020/0310853 A1* | 10/2020 | Featonby ............ G06F 9/45558 |
| 2020/0348959 A1 | 11/2020 | Krasner et al. |
| 2021/0209600 A1 | 7/2021 | Fontana et al. |
| 2022/0058042 A1 | 2/2022 | Vanjare |
| 2022/0070193 A1 | 3/2022 | Konda et al. |
| 2022/0283974 A1 | 9/2022 | Long |
| 2022/0334870 A1* | 10/2022 | Chen ..................... G06F 9/4856 |
| 2023/0112101 A1 | 4/2023 | Nainar |

OTHER PUBLICATIONS

International Search Report and Written Opinion of the International Searching Authority mailed Mar. 9, 2023, issued in the corresponding PCT Application No. PCT/US2022/053157 (18 pages).

International Search Report and Written Opinion mailed Apr. 11, 2023, issued in corresponding PCT Application No. PCT/US2022/053142 (11 pages).

International Search Report and Written Opinion mailed Apr. 12, 2023, issued in corresponding PCT Application No. PCT/US2022/053170 (12 pages).

International Search Report and Written Opinion mailed Apr. 18, 2023, for corresponding PCT Application No. PCT/ US2022/053169 (10 pages).

Shaikh Aaysha et al., "Framework for Security of Shared Data in Cloud Environment", 2016 International Conference on Computing Communication Control and Automation (ICCUBEA), IEEE, Aug. 12, 2016, pp. 1-6 (6 pages).

\* cited by examiner

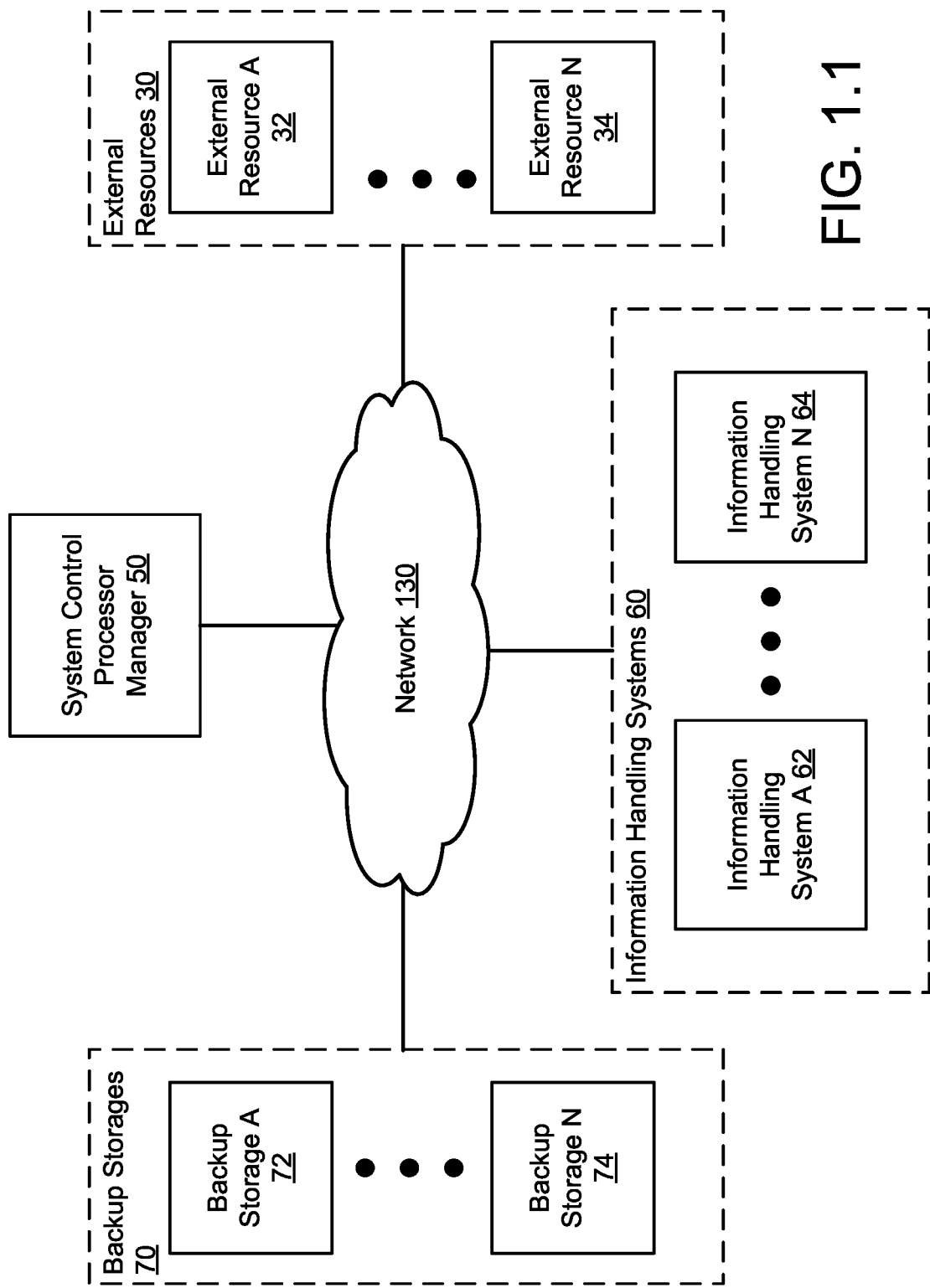
FIG. 1.1

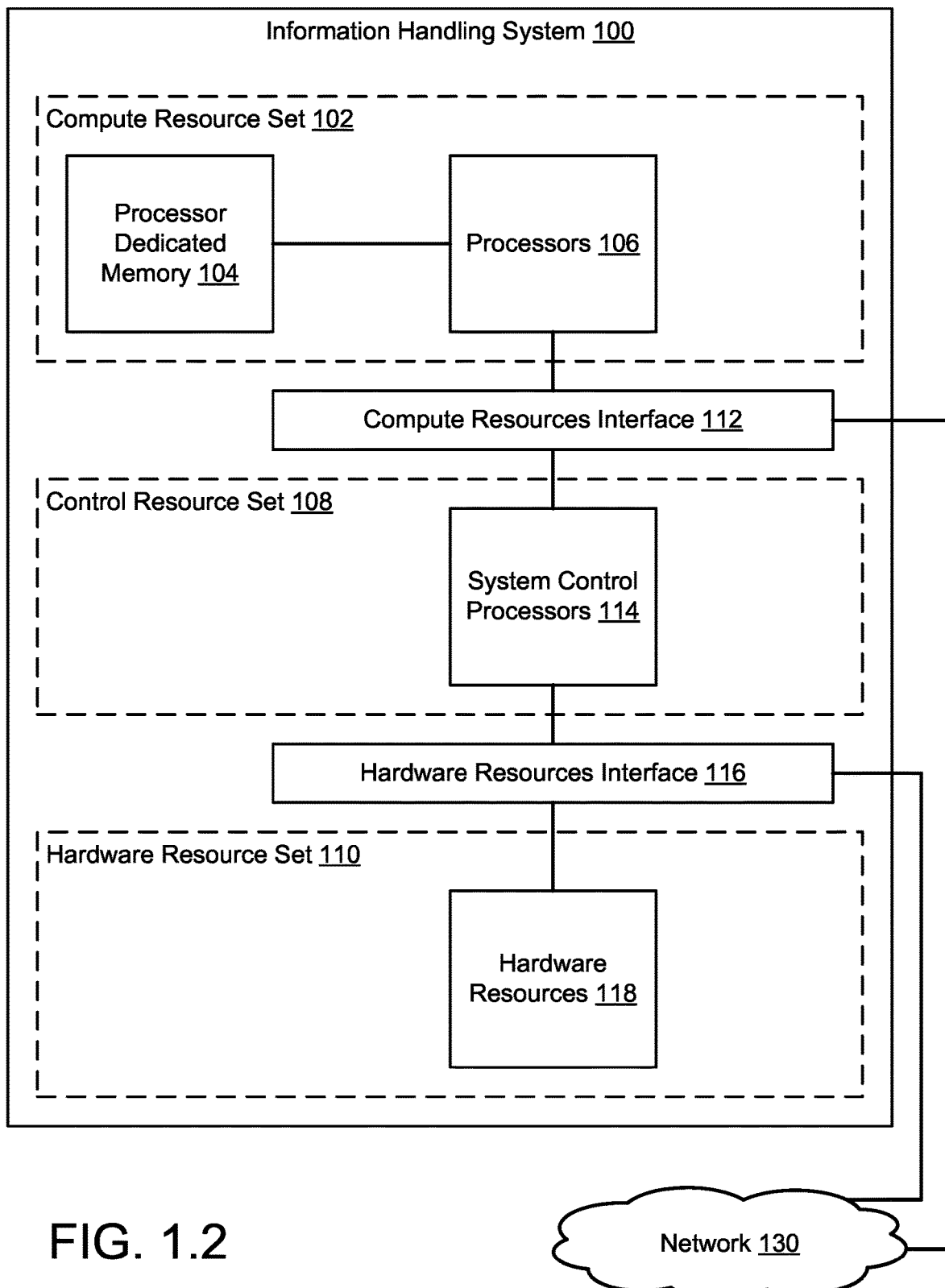
FIG. 1.2

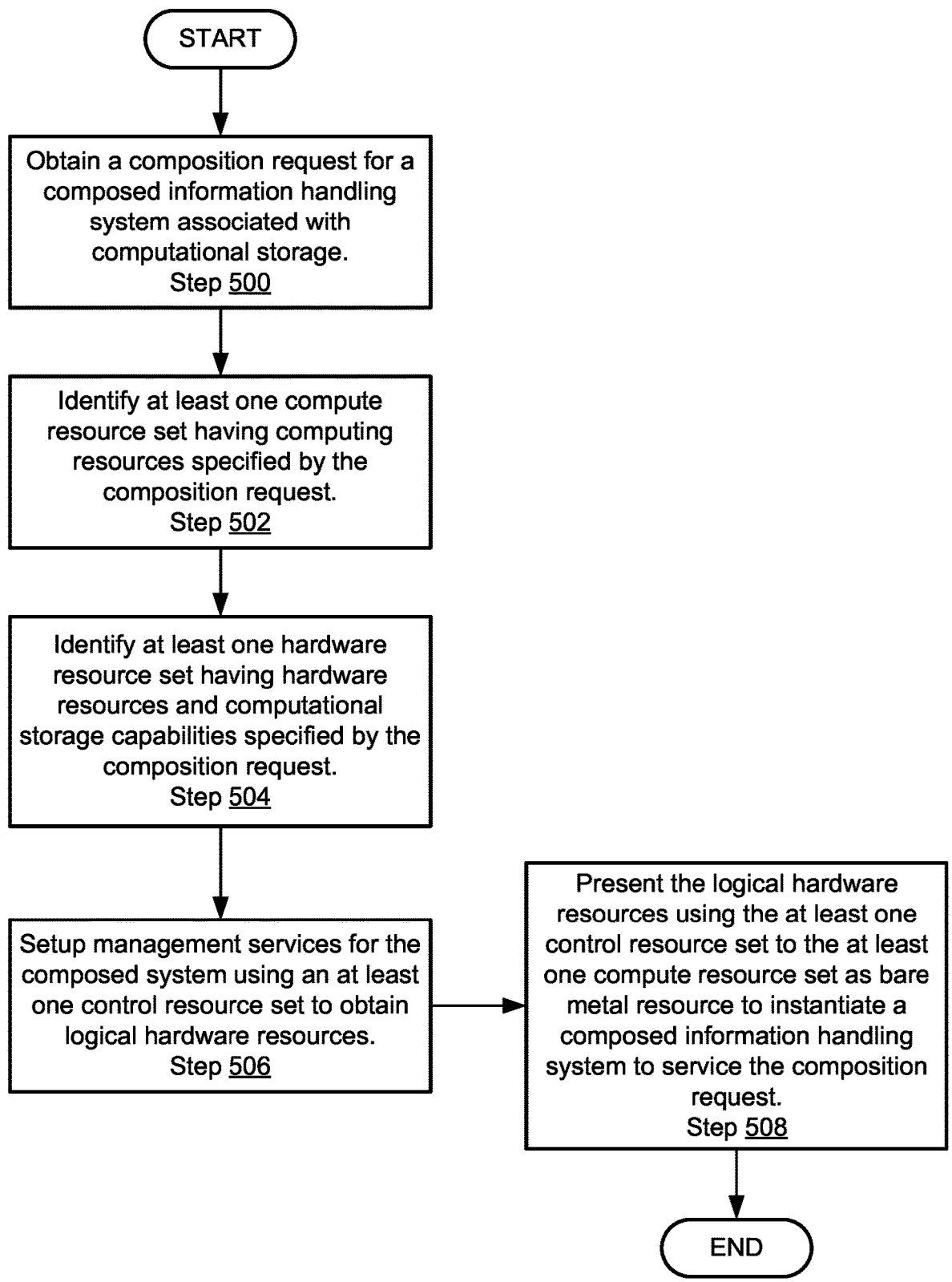
FIG. 5.1

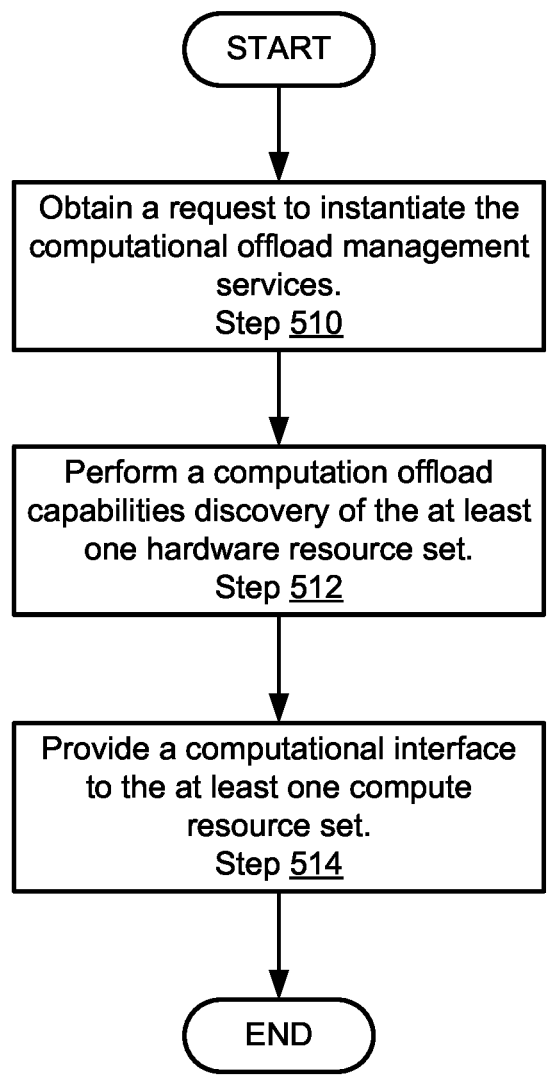
FIG. 5.2

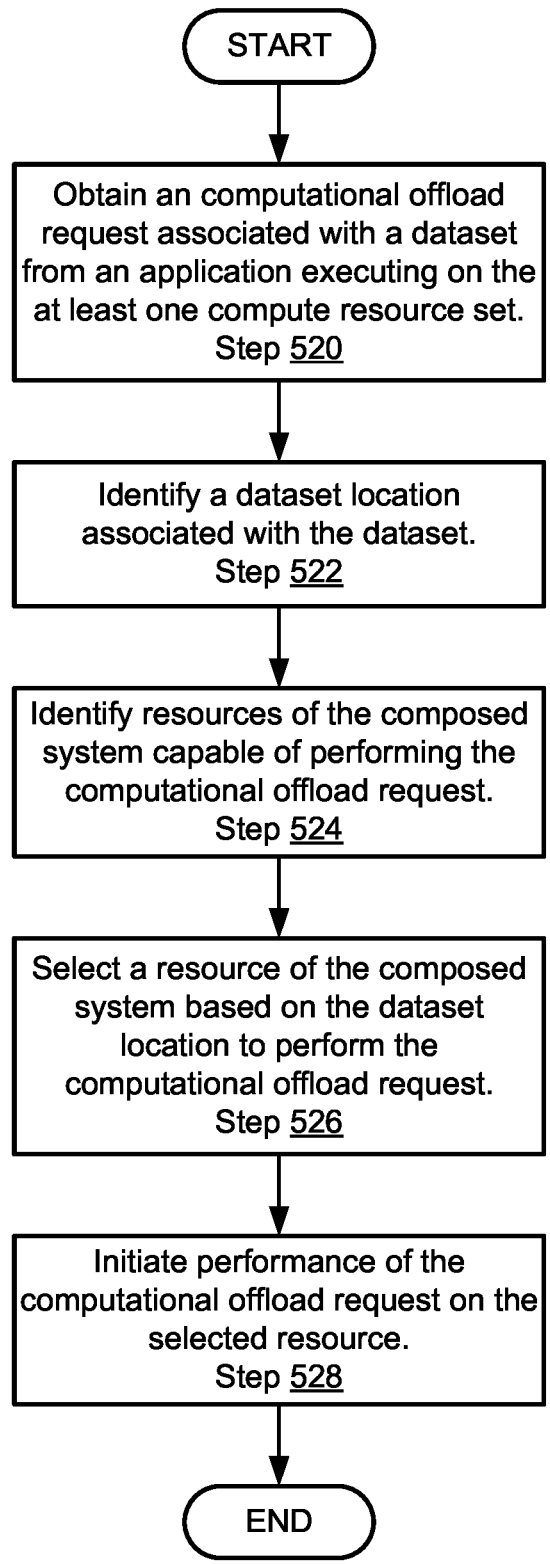
FIG. 5.3

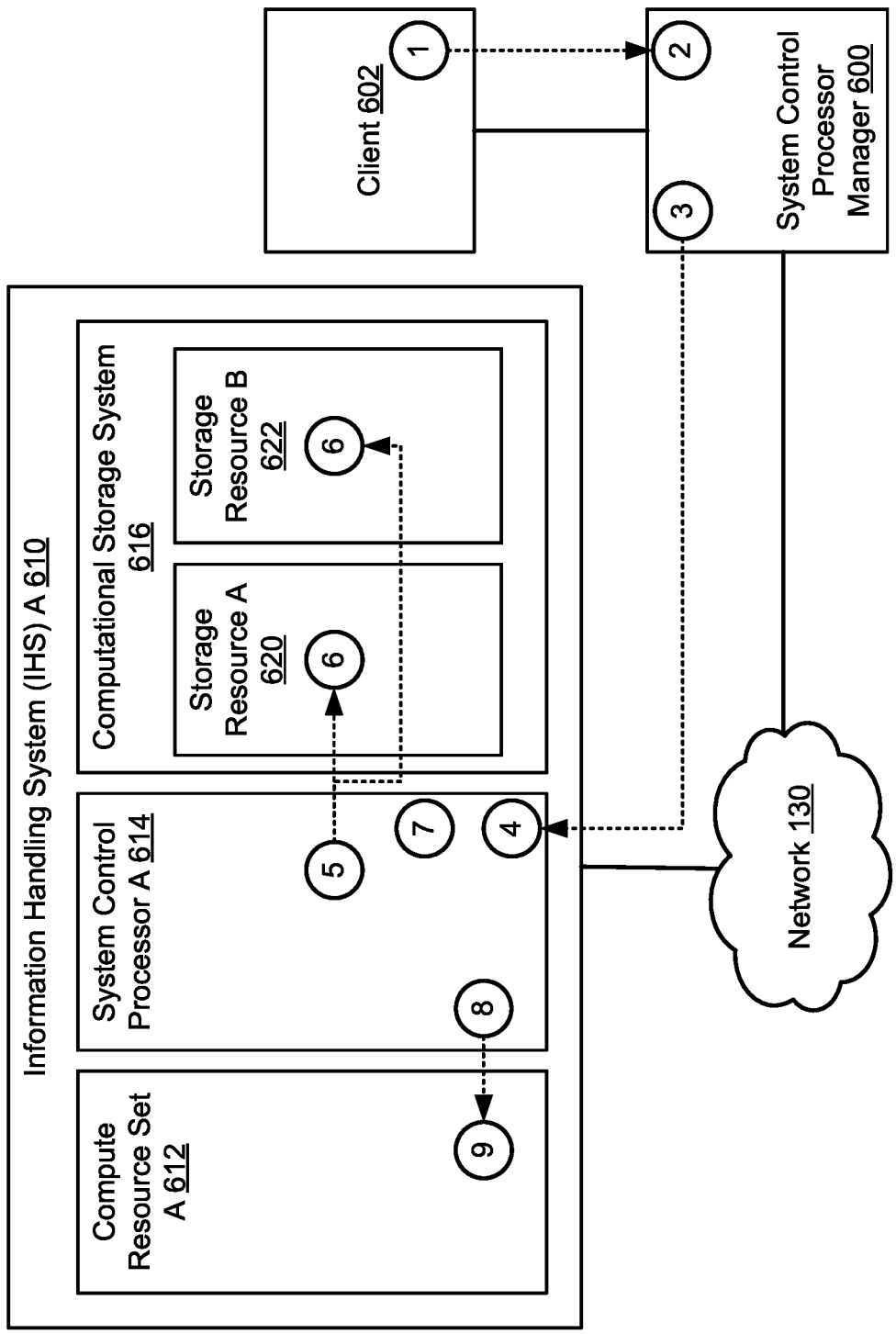
FIG. 6.1

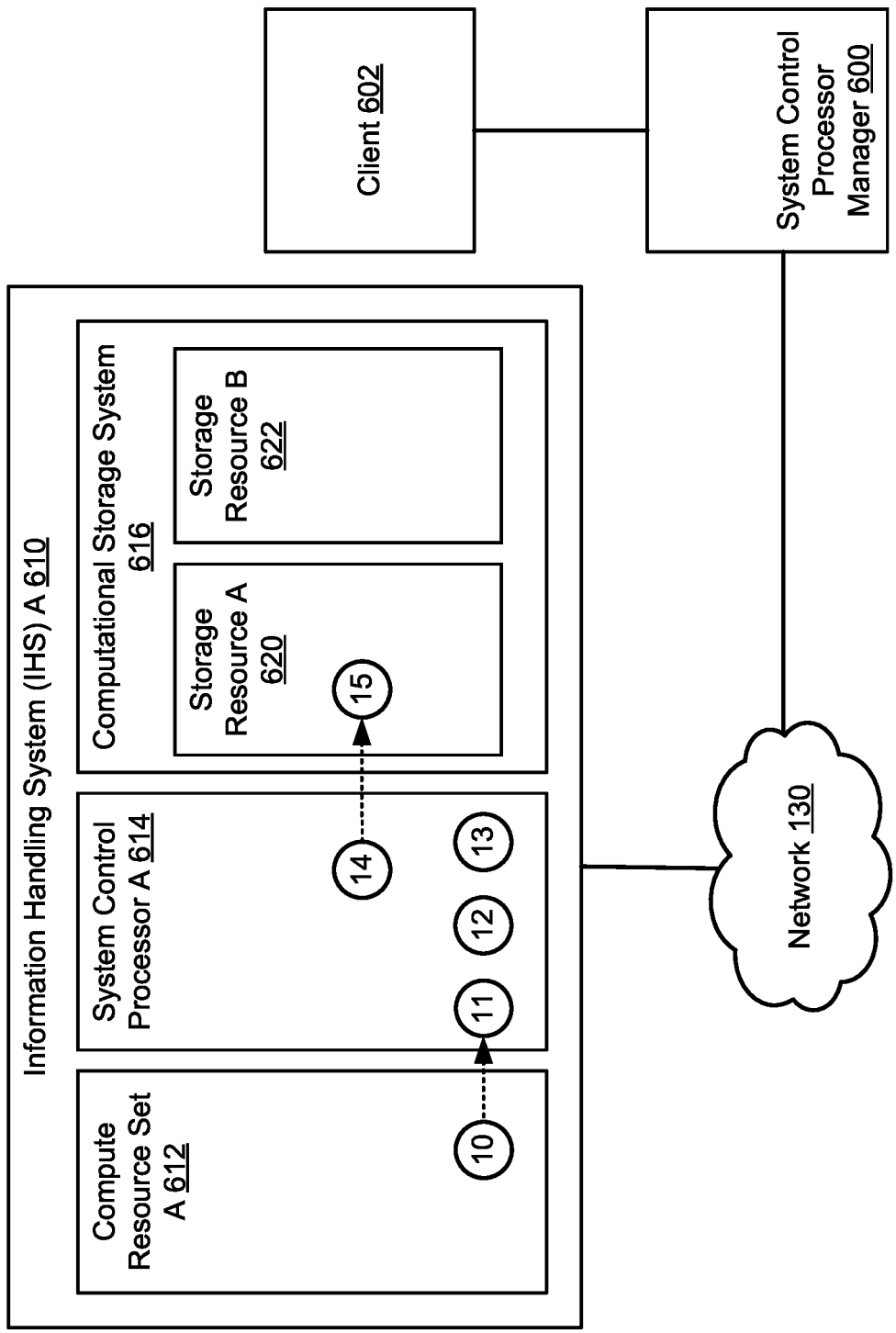
FIG. 6.2

COMPUTATIONAL OFFLOADS FOR COMPOSED INFORMATION HANDLING SYSTEMS

BACKGROUND

Computing devices may provide services. To provide the services, the computing devices may include hardware components and software components. The services provided by the computing devices may be limited by these components. The hardware components and software components may be allocated to provide the services. Some hardware components may include additional computational capabilities. A portion of the computer implemented services performed by some hardware components may be offloaded to other hardware components with additional computational capabilities.

SUMMARY

In general, certain embodiments described herein relate to a method for performing computational offloads for composed information handling systems. The method may include obtaining, by a system control processor associated with a composed information handling system, a computational offload request associated with a dataset from an application executing on an at least one compute resource set; in response to obtaining the computational offload request: identifying a dataset location associated with the dataset in the composed information handling system; identifying resources of the composed information handling system capable of performing the computational offload request; selecting a resource of the resources to perform the computational offload; and initiating performance of the computational offload request on the selected resource.

In general, certain embodiments described herein relate to a system for performing computational offloads for composed information handling systems. The system includes a system control processor manager, a plurality of information handling systems which include a plurality of system control processors, and a system control processor of the plurality of system control processors. The system control processor includes a processor and memory, and is programmed to obtain a computational offload request associated with a dataset from an application executing on an at least one compute resource set; in response to obtaining the computational offload request: identify a dataset location associated with the dataset in the composed information handling system; identify resources of the composed information handling system capable of performing the computational offload request; select a resource of the resources to perform the computational offload; and initiate performance of the computational offload request on the selected resource.

In general, certain embodiments described herein relate to a non-transitory computer readable medium that includes computer readable program code, which when executed by a computer processor enables the computer processor to perform a method for performing computational offloads for composed information handling systems. The method may include obtaining, by a system control processor associated with a composed information handling system, a computational offload request associated with a dataset from an application executing on an at least one compute resource set; in response to obtaining the computational offload request: identifying a dataset location associated with the dataset in the composed information handling system; identifying resources of the composed information handling system capable of performing the computational offload request; selecting a resource of the resources to perform the computational offload; and initiating performance of the computational offload request on the selected resource.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method for instantiating a composed information handling system in accordance with one or more embodiments of the invention.

FIG. 5.2 shows a flowchart of a method for setting up computational offload management services in accordance with one or more embodiments of the invention.

FIG. 5.3 shows a flowchart of a method for performing computational offloads in accordance with one or more embodiments of the invention.

FIGS. 6.1-6.2 show diagrams of the operation of an example system over time in accordance with one or more embodiments of the invention.

DETAILED DESCRIPTION

Figure 2:
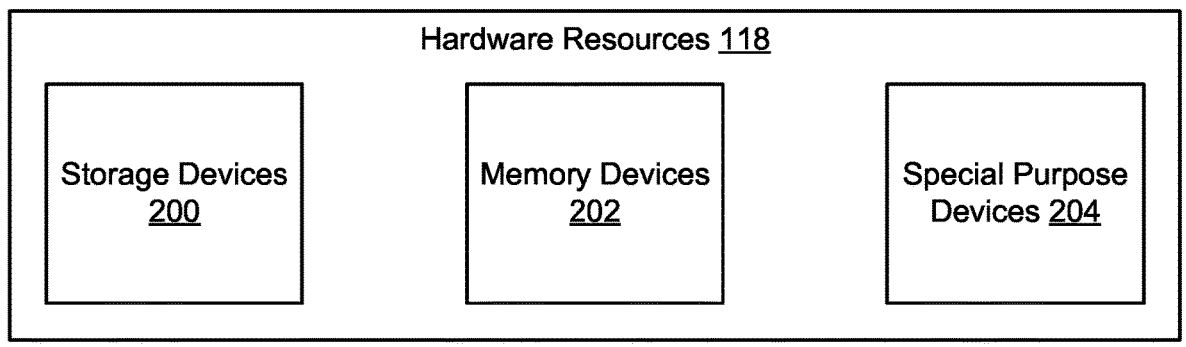
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general embodiments of the invention relate to methods, systems, and non-transitory computer readable mediums for performing computational offloads for composed information handling systems.

In one or more embodiments of the invention, composed information handling system are composed to perform computer implemented services. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

In traditional composed information handling system, particular computational resources may be allocated to execute applications and perform computations on data during the execution of the applications. The computations may include encryption, compression, deduplication, inferencing, indexing, video transcoding, and/or other or additional types of computations without departing from the invention. As a result, to perform such calculations, data may be required to move from hardware resources that store the data to the compute resources to perform the computations. Therefore, additional computing resources must be expended to perform the data movement to perform the computations, taking resources away from performing other tasks and leading to inefficiencies in the composed information handling systems.

To address, at least in part, the aforementioned issues, embodiments of the invention may leverage hardware resources with additional computational capabilities to off-load computations closer to the data. Such hardware resources may include, for example, computational storage systems, special purpose devices (e.g., GPUs, ASICs, etc.), system control processors, and any other hardware resources that includes additional computational capabilities without departing from the invention.

To allocate computing resources, the system may include a system control processor manager. The system control processor manager may obtain composition requests. The composition requests may indicate a desired outcome such as, for example, execution of one or more applications, providing of one or more services, etc. The desired outcome may also include the capability to perform computational offloads. The system control processor manager may compose a composed information handling system to leverage hardware resources with additional computational capabilities (e.g., computational storage systems, special purpose devices, etc.) to satisfy a computational offload intent. The system control processor manager may further instruct a system control processor to instantiate a computational offload manager to discover the computational offload capabilities of the composed information handling system, instantiate any computational offload service instances associated with the composed information handling system components, and provide a computational offload interface to applications executing on the at least one compute resource set of the composed information handling system. Consequently, an application executing on the at least compute resource set of the composed information handling system may request to perform a computational offload through the computational offload interface to the system control processor without the knowledge of how the computational offload is to be performed.

In response to obtaining the computational offload request, the system control processor may select a component of the composed information handling system capable of performing the computational offload and that may minimize the data movement required to perform the computational offload. As a result, computations may be performed closer to the data, minimizing the required data movement and improving the efficiency of the resources of the composed information handling systems.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 60) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

As discussed above, embodiments of the invention relate to system, methods, and devices for managing the hardware resources of the information handling systems (60) and/or other resources (e.g., external resources (30)) with additional computational capabilities to perform computational offloads for composed information handling systems and the information handling systems (60). The hardware resources of the information handling systems (60) may be managed by instantiating one or more composed information handling systems using the hardware resources of the information handling systems (60), external resources (30), and/or other types of hardware devices operatively connected to the information handling systems (60). During the instantiation of the composed information handling systems, one or more devices, including a system control processor, may be automatically setup to perform and/or manage computational offloads for the composed information handling system. Consequently, applications executing in composed information handling systems may request to offload computations to other hardware resources.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities an types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system (also referred to herein as a composed system) is a device that is formed using all, or a portion, of the computing resources of the information handling systems (60), the external resources (30), and/or other types of hardware devices operatively connected to the information handling systems (60). The composed information handling system may utilize the computing resources allocated to it to provide computer implemented services.

For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, data protection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may be provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

In one or more embodiments of the invention, the system of FIG. 1.1 includes backup storages (70) that provide data storage services to the composed information handling systems. The backup storages (70) may include any number of backup storages, for example, the backup storages (70) may include backup storage A (72) and backup storage N (74). The data storage services may include storing of data provided by the composed information handling systems and providing previously stored data to the composed information handling systems. The data stored in backup storages (70) may be used for restoration purposes. The data stored in the backup storages (70) may be used for other purposes without departing from the invention. The data stored in backup storages (70) may include backups generated during the performance of data protection services of the composed information handling systems. The backups may be any type of backup (e.g., snapshot, incremental backup, full backup, etc.) without departing from the invention. The data stored in backup storages (70) may include other and/or additional types of data obtained from other and/or additional components without departing from the invention.

The system of FIG. 1.1 may include any number of information handling systems (e.g., 62, 64), any number of external resources (e.g., 32, 34), any number of backup storages (e.g., 72, 74), and any number of system control processor managers (e.g., 50). Any of the components of FIG. 1.1 may be operatively connected to any other component and/or other components not illustrated in FIG. 1.1 via one or more networks (e.g., 130). The networks may be implemented using any combination of wired and/or wireless network topologies.

The system control processor manager (50), information handling systems (60), backup storages (70), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), backup storages (70), and/or external resources (30) described in this application and/or all, or a portion, of the methods illustrated in FIGS. 5.1-5.3. The system control processor manager (50), information handling systems (60), backup storages (70), and/or external resources (30) may be implemented using other types of computing devices without departing from the invention. For additional details regarding computing devices, refer to FIG. 7.

While the system has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and perform/manage computational offloads. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated. Additionally, the control resource set (108) may prepare hardware resource sets (e.g., 110) or other computer resources (e.g., system control processors (114)) to perform and/or manage computational offloads.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operatively connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operatively connected to one or more system control processors (114) of the control resource set (108). For example, the processors (106) may be connected to a compute resource interface (112), which is also connected to the system control processors (114).

The system control processors (114) of the control resource set (108) may present computing resources to the processors (106) as bare metal resources. In other words, from the point of view of the processors (106), any number of bare metal resources may be operatively connected to it via the compute resources interface (112) when, in reality, the system control processors (114) are operatively connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operatively connected to it (e.g., the hardware resource set (110), other resources operatively connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operatively connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operatively connected to other hardware resource sets of other information handling systems via hardware resources interface (116), network (130), and/or other system control processors of the other information handling systems. The system control processors (114) may cooperatively enable hardware resource sets of other information handling systems to be prepared and presented as bare metal resources to the compute resource set (102).

In an additional example, the system control processors (114) may be operatively connected to external resources via hardware resources interface (116) and network (130). The system control processors (114) may prepare and present the external resources as bare metal resources to the compute resource set (102).

Figure 3:
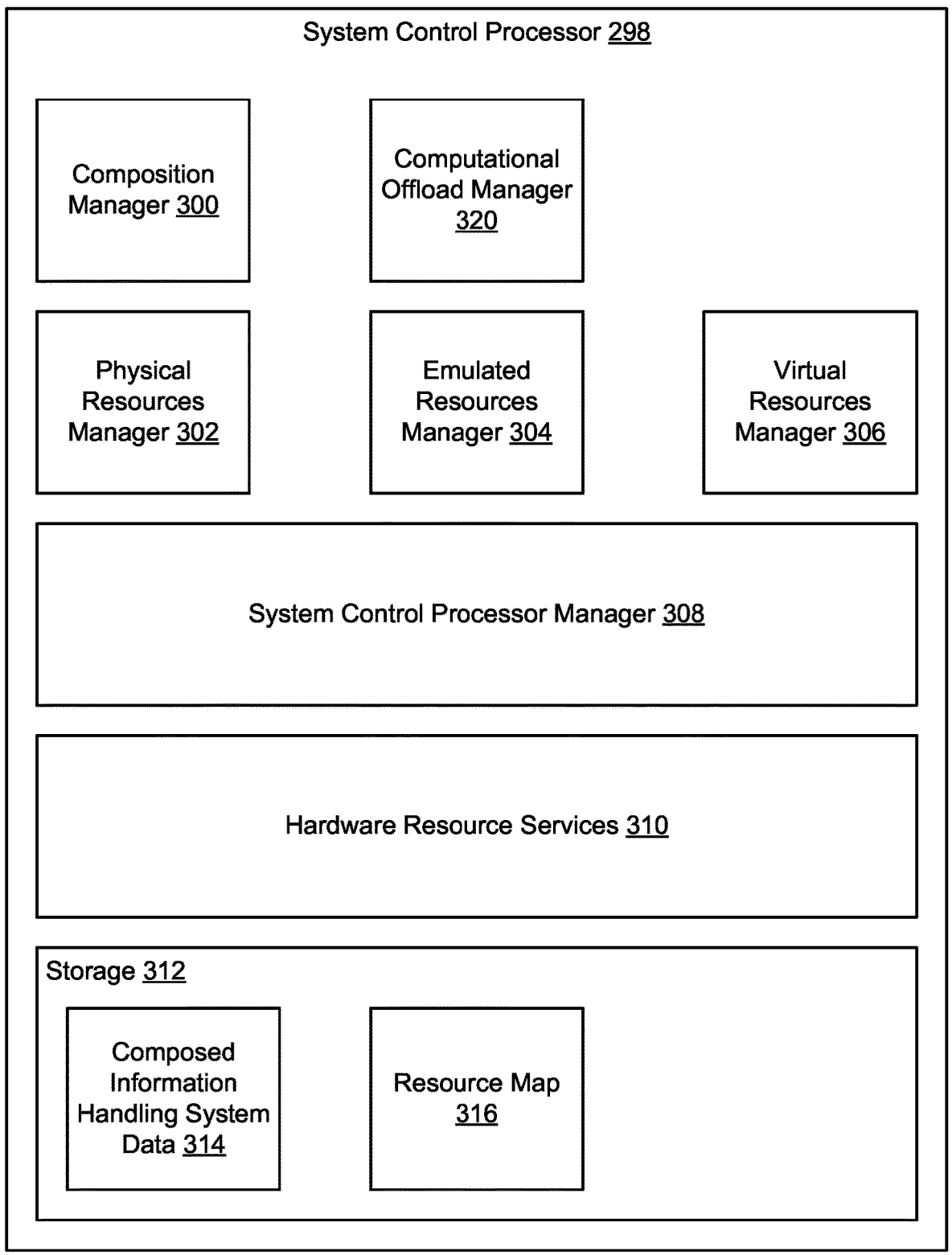
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (10) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (10) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operatively connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.3. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, any portion of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The system control processors or other entities may write data chunks to the storage devices (200). The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models, including computational offload models. The models may include other models such as, for example, security models, workload performance availability models, reporting models, etc. The computational offload models may include performing computational offloads for composed information handling systems. For additional information regarding the performance of computational offloads, refer to FIG. 5.3.

The manner of operation of these devices (i. e., the performance of the aforementioned computational offloads) may be transparent to the computing resource sets providing computer implemented services. Consequently, even though the resulting composed information handling system control plane and users may be unaware of the implementation of these models, the composed information handling systems may still operate in accordance with these models thereby providing a reliable and efficient method of performing computational offloads for composed information handling systems.

While the hardware resources (118) have been illustrated and described as including a limited number of specific components, hardware resources (118) in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide computational offload capabilities for the composed information handling system.

To instantiate and operate composed information handling systems, the system control processor (298) may include a composition manager (300), a physical resources manager (302), an emulated resources manager (304), a virtual resources manager (306), a computational offload manager (320), an system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) add/remove/modify resources presented to the compute resource sets of composed information handling systems dynamically in accordance with workloads being performed by the composed information handling systems, and/or (vii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or other information regarding hardware components of the information handling system that may be allocated to form composed information handling systems.

The composition manager (300) may obtain composition requests from other entities (e.g., management entities tasked with instantiating composed information handling systems) as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, data protection services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operatively connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To perform the aforementioned computational offloads, the system control processor (298) may include the computational offload manager (320). The computational offload manager (320) may include the functionality to perform computational offload management services. The computational offload management services may include (i) discovering computational capabilities of hardware resources of the composed information handling system, (ii) providing a computational offload interface to the at least one compute resource set based on the discovery, (iii) obtain requests to perform computational offloads, (iv) identify dataset locations of datasets associated with the computational offload request, (v) identifying hardware resources capable of performing the computational offload request, (vi) selecting one or more hardware resources to perform the computational offload request to minimize the movement of the dataset, and (vii) initiate performance of the computational offload request at the selected hardware resources. The computational offload management services may include other and/or additional services without departing from the invention. For additional information regarding the computational offload management services, refer to FIGS. 5.2-5.3. Other components of the system control processor (298) (e.g., composition manager (300)) may perform all, or a portion, of the computational offload management services without departing from the invention.

The functionalities of the physical resources manager (302), emulated resources manager (304), virtual resources manager (306), and the computational offload manager (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the computational offload manager (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the computational offload manager (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIG. 5.1-5.3.

The system control processor (298) may be implemented using computing devices. The computing devices may be, for example, an embedded computing device such a system on a chip, a processing device operatively coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.3. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), computational offload manager (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), computational offload manager (320), system control processor manager (308), and/or hardware resource services (310). The composition manager (300), physical resources manager (302), emulated resources manager (304), virtual resources manager (306), computational offload manager (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), computational offload manager (320), system control processor manager (308), and/or hardware resource services (310) are implemented using a processor adapted to execute computing code stored on a persistent storage (e.g., as part of the system control processor (298) or operatively connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), computational offload manager (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may further include dataset information. The dataset information may include dataset identifiers associated with data stored in components of the composed information handling system. A dataset identifier may be unique combinations of bits and/or characters associated with a particular dataset (i.e., files, data blocks, and/or objects) stored in one or more computing resources of the composed information handling system. Each dataset identifier may be associated with a dataset location. The dataset location may indicate the location that the dataset is stored in the composed information handling system. The dataset location may include, for example, a hardware resource identifier, a reference to a particular portion of a hardware resource (e.g., a pointer), and/or any other appropriate information that may be used to identify the location of a dataset in a composed information handling system without departing from the invention. The dataset information may include other and/or additional information regarding datasets associated with the composed information handling system without departing from the invention.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems as the composed information handling systems execute workflows and perform computer implemented services including generating data, obtaining data, and performing computations on data.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The resource map (316) may further specify the computational offload capabilities for the hardware resources of information handling systems and/or external resources associated with the system control processor (298). The resource map (316) may include, for example, a list of hardware resource identifiers associated with hardware resources capable of performing computational offloads.

Each hardware resource identifier may further be associated with one or more types of computational offloads that may be performed by the hardware resource associated with the hardware resource identifier. The resource map (316) may include other and/or additional information associated with resources of information handling systems and/or external resources associated with the system control processor (298) without departing from the invention.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While illustrated in FIG. 3 as being stored locally on the storage (312) of the system control processor (298), the composed information handling system data (314) and the resource map (316) may be stored remotely and may be distributed across any number of devices including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
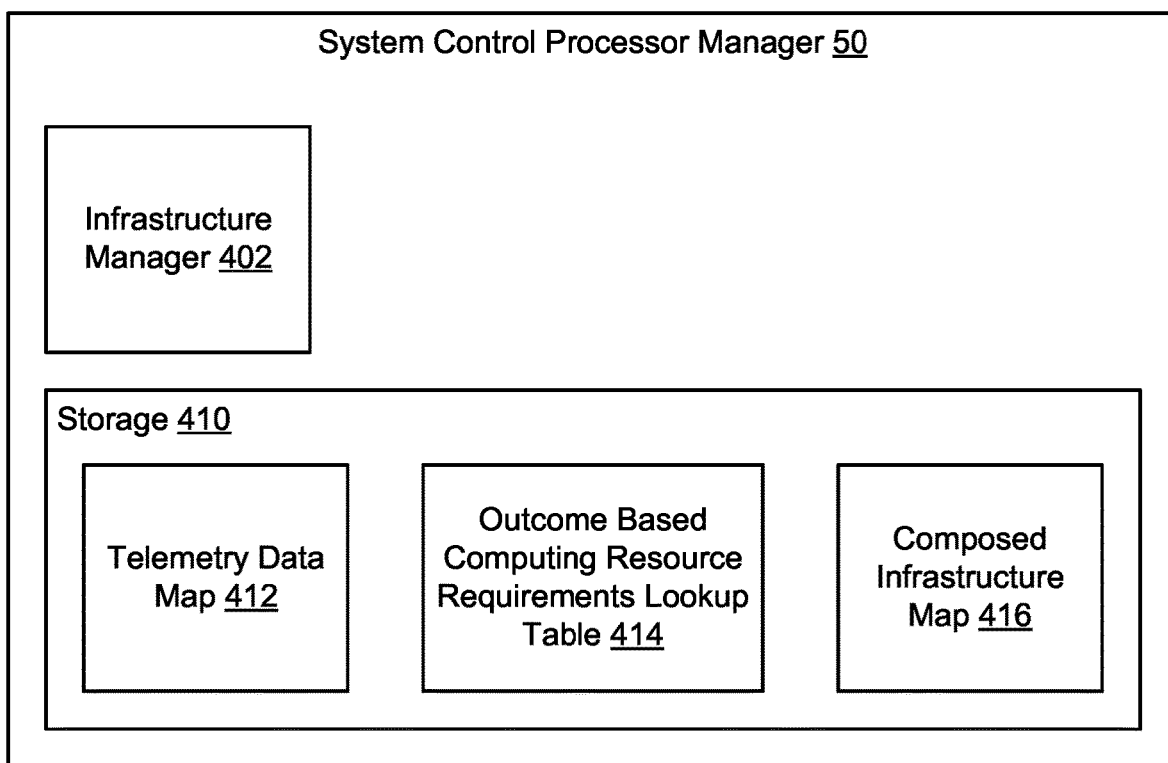
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402), and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management (e.g., computational offloads), and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, user identifiers (e.g., a unique combination of bits associated with a particular user) associated with one or more users using the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over time to meet changing workloads imposed on composed information handling systems.

The system control processor manager (50) may fail and/or otherwise lose the telemetry data map (412) and the composed infrastructure map (416) for any reason without departing from the invention. To continue to provide composition services, the system control processor manager (50) may restore the telemetry data map (412) and the composed infrastructure map (416) by performing a discovery to obtain telemetry data from system control processors and obtaining state information associated with the composed systems from one or more system control processors. The system control processor manager (50) may use the telemetry data and the state information to repopulate the telemetry data map (412) and the composed infrastructure map (416) and to determine whether any composed information handling systems need to be re-composed.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.3.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i. e., volatile storage), long term storage devices (i. e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414), and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.3 show methods that may be performed by components of the system of FIG. 1.1 to compose and manage composed information handling systems.

Turning to FIG. 5.1, FIG. 5.1 shows a flowchart of a method in accordance with one or more embodiments of the invention. The method depicted in FIG. 5.1 may be performed to instantiate a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operatively connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources. The list of computing resources may include computing resources to be used to provide data protection services.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The composition request may specify that data protection services are to be provided to the computing resources of the composed information handling system.

The data protection services may include performing deduplication and/or compression on data generated by applications executing in the composed information handling system. The methods employed by the system control processors, or a portion thereof, may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request. In another example, the desired outcome may be a list of applications to be hosted in response to the composition request. In other words, the composition request may specify a desired outcome without specifying the resources that are to be used to satisfy the requests, the methods of managing the resources, models employed to provide for data protection/integrity/security/etc. Such a composition request may be referred to as an intent based composition request.

In one or more embodiments of the invention, the desired outcome includes the desire to perform computational offload management services. As discussed above, computational offloads may refer to offloading one or more computations of data from the applications to other hardware devices included in the resulting composed information handling system. The composition request may further specify the types of computational offloads (e.g., encryption, compression, deduplication, inferencing, filtering, indexing, etc.) to be performed. The composition request may include other and/or additional information regarding the computational offload intent without departing from the invention.

In step 502, at least one compute resource set having computing resources specified by the composition request is identified. The at least one compute resource set may be identified by matching the computing resources specified by the composition request to at least one compute resource set having those resources using a telemetry data map (412, FIG. 4).

For example, the telemetry data map (412, FIG. 4) specify a list of compute resource sets, identifiers of control resource sets that manage the listed compute resource sets, the hardware devices of the listed compute resource sets, and characteristics and information regarding the compute resource set (e.g., memory size, storage size). By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set.

In step 504, at least one hardware resource set having hardware resources specified by the composition request is identified. The at least one hardware resource set may be identified similarly to that described with respect to the identified of the at least one compute resource set of step 502. For example, the hardware resources requirements specified by the composition request may be matched to hardware resource sets.

As discussed above, the composition request may include and intent to perform computational offloads. As a result, the system control processor manager may identify one or more hardware resources that include the capabilities to perform one or more computational offloads. The system control processor manager may use the outcome based computing resource requirements lookup table (e.g., 414, FIG. 4) to identify the at least one hardware resource set having one or more hardware resources that include the capability to perform computational offloads as required by the composition request.

In step 506, management services for the composed system are setup using the at least one control resource set to obtain logical hardware resources.

In one or more embodiments of the invention, the system control processor manager prepares the at least one control resource set to perform computational offload management services. To prepare the at least one control resource set to perform the computational offload management services, the system control processor manager may cooperate with the at least one control resource set. For example, the system control processor manager may generate instructions for implementing the computational offloads using the at least one hardware resource set, encapsulate the instructions in a message, and send the message to one or more system control processors of the new control resource set. In response to receiving the message, the system control processors may implement the instructions thereby implementing the computational offloads services.

Setting up computational offload management services and other management services for the hardware resource set may include, for example, preparing translation, indirection, or abstraction tables used to translate logical addresses provided by compute resource sets to physical addresses utilized by hardware devices of the hardware resource.

In another example, setting up computational offload management services and other management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing computational offload management services and management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up computational offload management services and other management services may further include modifying the operation of one or more devices to provide computational offload management services and management functionality. Management functionalities may include, for example, data integrity functionality (e.g., RAID, ECC, etc.), security functionality (e.g., encryption), data protection functionality and/or other functionalities that are transparent to the composed information handling system. Moreover, setting up management services may include instantiating one or more hardware device clients and/or interfaces (e.g., APIs) that may be used to facilitate the communication of instructions and/or data from the system control processor to the hardware devices of the at least one hardware resource set.

In step 508, the logical hardware resources are presented to the at least one compute resource set as bare metal resources using the at least one control resource set to instantiate the composed information handling system to service the composition request.

To present the logical hardware resources, the system control processor manager may instruct the system control processors of the at least one control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

The method may end following step 508.

Using the method illustrated in FIG. 5.1, a composed information handling system may be formed using computing resources from one or more information handling systems and/or external resources with the capability to perform computational offloads.

Following step 508 of FIG. 5.1, no applications may be presently executing on the composed information handling system. The composed information handling systems may then be turned over to other entities for management (e.g., orchestrators) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIG. 5.2, FIG. 5.2 shows a flowcharts of a method in accordance with one or more embodiments of the invention. The method of FIG. 5.2 may be performed to set up computational offload management services in accordance with one or more embodiments of the invention. The method shown in FIG. 5.2 may be performed by, for example, a system control processor (e.g., 114, FIG. 1.2). Other components of the system in FIG. 1.1 or FIG. 1.2 may perform all, or a portion, of the methods of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, obtain a request to instantiate the computational offload management services. As discussed above, the system control processor may obtain a message from the system control processor manager. The message may include instructions for implementing computational offload management services. The system control processor may use the aforementioned instructions to instantiate the computational offload management services. The system control processor may, for example, one or more computer instructions included in the message to instantiate the computational offload service. As another example, the system control processor may instantiate a computational offload manager that performs all, or a portion, of the computational offload management services using a device image included in the request obtained from the system control processor manager. The computational offload service may be instantiated via other and/or additional methods without departing from the invention.

In step 512, a computational offload capabilities discovery of the at least one hardware resource set is performed. In one or more embodiments of the invention, the computational offload manager of the system control processor may perform a discovery of the computational offload capabilities of the at least one hardware resource set using composed information handling system data (e.g., 314, FIG. 3) and a resource map (e.g., 316, FIG. 3). As discussed above, the composed information handling data may specify hardware resources included in the at least one hardware resource set of the composed information handling system. The computational offload manager may identify the hardware resources included in the composed information handling system using the composed information handling system data. The computational offload manager may then identify the computational offload capabilities of the hardware resources of the at least one hardware resource set of the composed information handling system using the resource map.

As discussed above, the resource map may include hardware resource identifiers associated with all resources of the information handling system and/or external resources associated with the system control processor. Each hardware resource identifier may be associated with a resource type that may indicate the type of resource if the corresponding hardware resource. Each hardware resource identifier may be associated with one or more types of computational offloads which the corresponding hardware resource may be capable of performing The computational offload engine may identify the computational offload capabilities and the resource type of each hardware resource included in the composed information handling system. The computational offload capabilities discovery of the at least one hardware resource set may be performed via other and/or additional methods without departing from the invention.

In step 514, a computational offload interface is provided to the at least one compute resource set. The computational offload manager may further instantiate one or more computational offload service instances based on the hardware resource types of the identified hardware resources with computational offload capabilities. As an example, the computational offload manager may instantiate a block computational offload service for computational block storage devices, a file system computational offload service for computational file system storage devices, an object computational offload service for computational object storage devices, etc. The computational offload service instances may facilitate the communication of instructions and/or data between the at least one compute resource set (e.g., applications, drivers, application programming interfaces (APIs) and/or clients executing on the at least one compute resource set), the computational offload manager, and the at least one hardware resource set during the performance of computational offloads.

After instantiating the computational offload services, the computational offload manager may provide the computational offload interface by exposing the computational offload service instances to the at least one compute resource set and the components executing thereon. As a part of the exposing the computational offload interface, the computational offload manager may provide any information that may enable applications executing on the at least one compute resource set to request the performance of computational offloads. The information may include, for example, any appropriate libraries, API calls, commands, drivers, computational offload capabilities, or other types of information associated with the performance of computational offloads without departing from the invention. The computational offload interface may be provided to the at least one compute resource set via other and/or additional methods without departing from the invention.

In one or more embodiments of the invention, the method ends following step 514.

Using the method illustrated in FIG. 5.2, a system control processor may setup computational offload services. As a result, an application executing on the at least one compute resource set may send a request to perform a computational offload to the computational offload manager of the system control processor. In response to obtaining the request, the computational offload manager may select a hardware resource of the at least one hardware resource set to perform the computational offload. Therefore, the application may offload a portion of the computations required to perform computer implemented services to hardware resources. As a result, the compute resources of the at least one compute resource set may be used more efficiently.

Turning to FIG. 5.3, FIG. 5.3 shows a flowcharts of a method in accordance with one or more embodiments of the invention. The method of FIG. 5.3 may be performed to perform computational offloads in accordance with one or more embodiments of the invention. The method shown in FIG. 5.3 may be performed by, for example, a system control processor (e.g., 114, FIG. 1.2). Other components of the system in FIG. 1.1 or FIG. 1.2 may perform all, or a portion, of the methods of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a computational offload request is obtained from an application executing on the at least one compute resource set. In one or more embodiments of the invention, the application sends a request to the computational offload manager of the system control processor. The request may include an API call or command issued using the computational offload interface. The request may specify one or more computations (i.e., types of computational offloads) that are to be offloaded to a hardware resource of the at least one hardware resource set. The request may further specify one or more identifiers for data sets (e.g., files, objects, and/or data blocks) for which the one or more computations are to be performed.

The application executing on the at least one compute resource set may include the dataset for which the computational offloads are to be performed. In such scenarios, the request may include such data or the application may provide the dataset location of such data so that the computational offload manager may move the data to perform the computational offload.

The request may also be associated with a dataset that is not included in the composed information handling system (e.g., it may be included in another composed handling system, a user device such as a client, etc.). In such scenarios, the application may additionally provide any appropriate information that may be used to obtain the dataset (e.g., composed information handling system identifiers, network addresses, encryption keys, system control processor identifiers, etc.) without departing from the invention.

A computational offload request may be obtained from an application executing on the at least one compute resource set via other and/or additional methods without departing from the invention.

In step 522, a dataset location of the dataset associated with the computational offload request is identified. In one or more embodiments of the invention, the computational offload manager uses the dataset identifier included in the request obtained in step 520 to identify the dataset associated with the request. In scenarios in which the request is associated with a dataset included in the composed information handling system, the computational offload manager may identify the dataset location of the dataset using the composed information handling system data (e.g., 314, FIG. 3). As discussed above, the composed information handling system data may include dataset information. The computational offload manager may match the dataset identifier included in the request with a dataset identifier included in the dataset information of the composed information handling system. The computational offload manager may identify the dataset location associated with the matching dataset identifier.

In scenarios in which the dataset is included in the at least one compute resource set, the computational offload manager may parse the request to identify either the dataset included with the request or the dataset location of the dataset included in the request.

In scenarios in which the dataset is not included in the composed information handling system, the computational offload manager may use the any appropriate information (e.g., composed information handling system identifiers, network addresses, encryption keys, system control processor identifiers, etc.) provided in the request to identify, obtain, and store the dataset in dataset location of the composed information handling system without departing from the invention.

A dataset location associated with the dataset may be identified via other and/or additional methods without departing from the invention.

In step 524, resources of the composed information handling system capable of performing the computational offload request are identified. As discussed above, based on the discovery of the computational offload capabilities of the hardware resources of the composed information handling system, the computational offload manager may include or otherwise have access to a list of hardware resources capable of performing computational offloads and the computational offload capabilities of each hardware resource included in the list. The computational offload manager may compare the computations (i.e., types of computational offloads) specified in the request obtained in step 520 with the types of computational offloads that may be performed by each hardware resource. The computational offload manager may identify any hardware resource identifiers that are associated with types of computational offloads that match the computations included in the request. The hardware resources associated with the identified hardware resource identifiers may be identified as the resources of the composed information handling system capable of performing the computational offload request. Resources of the composed information handling system capable of performing the computational offload request may be identified via other and/or additional methods without departing from the invention.

In step 526, a resource of the composed information handling system is selected to perform the computational offload request based on the dataset location associated with the dataset. The computational offload manager may select the resource that minimizes the required movement of the dataset to perform the computational offload request. In other words, the computational offload manager may select the resource that is closest to the dataset location to perform the computational offload. Other parameters (e.g., resource availability, resource performance, etc.) may be considered when selecting the resource to perform the computational offload request without departing from the invention. A resource of the composed information handling system may be selected to perform the computational offload request based on the dataset location associated with the dataset via other and/or additional methods without departing from the invention.

As a simple example, the system control processor, a special purpose device, and a computational storage system of the composed information handling system may all be capable of performing the computational offload request. The computational storage system may include the dataset. The computational storage system is associated with the least distance from the dataset, therefore, the computational offload manager may select the computational storage system.

A computational storage system may refer to a collection of storage devices and a storage controller. The storage controller, in additional to managing reads and writes of data to the storage devices, may include the capability to perform additional computations. A computational storage system may include other types of systems for storing data with additional computational capabilities without departing from the invention.

In step 528, performance of the computational offload request on the selected resource is initiated. In one or more embodiments of the invention, the computational offload manager may send a request to perform the computational offload request to the selected resource. The computational offload manager may send the request through any computational service instance, driver, client, and/or interface associated with the selected resource (e.g., file system computational service instance for a file system computational storage device). If necessary, the computational offload manager may also initiate the movement of the dataset to the selected resource to perform the computational offload request on the selected resource. The computational offload manager may move the processed dataset that results from the performance of the computational offloads back its dataset location, a new dataset location specified by the application, or provide the processed dataset to the application for further processing. The computational manager may notify the application that the computational offload has been performed. The performance of the computational offload request on the selected resource may be initiated via other and/or additional methods without departing from the invention.

In one or more embodiments of the invention, the method ends following step 528.

Using the method illustrated in FIG. 5.3, computational offloads may be performed by one or more system control processors for composed information handling systems. As a result, computations may be performed closer to the data, minimizing the required data movement and improving the efficiency of the resources of the composed information handling systems. Additionally, the computational offloads may be performed at any hardware resource of a composed information handling system without the knowledge of the applications that initiated the computational offloads.

To further clarify embodiments of the invention, a non-limiting example is provided in FIGS. 6.1-6.2. FIGS. 6.1-6.2 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 are illustrated in FIGS. 6.1-6.2.

EXAMPLE

Turning to FIG. 6.1, consider a scenario in which a client (602), at step 1, sends a composition request to a system control processor manager (600) that manages information handling systems (IHS) A (610). The composition request specifies that a composed information handling system is to be instantiated with the capability to perform computational offloads.

In response to the composition request, the system control processor manager (600), at step 2, identifies computing resources to be allocated to the composed information handling system using an outcome based computing resource requirements lookup table (not shown). The outcome based computing resource requirements lookup table specifies that compute resource set A (612), a control resource set including system control processor A (614), and a hardware resource set including a computational storage system (616) including two storage resources of one terabyte each satisfies the composition request.

As a result, at step 3, the system control processor manager (600) determines that compute resource set A (612), system control processor A (614), and the computational storage system (616) of IHS A (610) are to be used to instantiate the composed information handling system. Furthermore, the system control processor manager (600) determines that system control processor A (614) are to perform computational offload services.

Based on the determinations, a message, at step 4, indicating that these resources of IHS A (610) is sent to system control processor A (614). The message indicates that compute resource set A (612) and two one terabyte portions of the computational storage system (616) are to be allocated to the composed information handling system. The message also indicates that system control processor A (614) is to provide computational offload services.

In response to the message, at step 5, system control processor A (614) determines that one terabyte of the computational storage system (616) should be presented by virtualizing a terabyte of one or more storage devices of the computational storage system (616) as storage resource A (620). System control processor A (614) generates an appropriate address translation table associated with storage resource A (620) to present the one terabyte of storage as storage resource A (620). System control processor A (614) additionally determines that another one terabyte of the computational storage system (616) should be presented by virtualizing a second terabyte of one or more storage devices of the computational storage system (616) as storage resource B (620). System control processor A (614) generates a second appropriate address translation table associated with storage resource B (620) to present the one terabyte of storage as storage resource B (620).

At step 6, system control processor A (614) uses the appropriate address tables to obtain storage resource A (620) and storage resource B (622) from the computational storage system (616).

At step 7, to satisfy the computational offload requirements, system control processor A (614) instantiates a computational offload manager. The computational offload manager then performs a discovery of computational capabilities of the composed information handling system. The computational offload manager identifies two resources of the composed information handling system that are capable of performing computational offloads: the system control processor A (614) and the computational storage system (616). Additionally, the computational offload manager identifies that the computational storage system (616) is capable of performing encryption and compression. The computational offload manager further identifies that the system control processor is capable of performing encryption, compression, deduplication, indexing, and inferencing. Based on the discovery, the computational offload manager of system control processor A (614) instantiates a computational storage system computational offload service.

At step 8, system control processor A (614) provides a computational offload interface to an application executing on compute resource set A (612). As a result, the application executing on compute resource set A (612) may submit computational offload requests to system control processor A (614) through the computational offload interface. At step 9, the application executes the workflow and the composed information handling system performs computer implemented services for a user.

Turning to FIG. 6.2, at step 10, some point in time after step 9 of FIG. 6.1, the application executing on compute resource set A (612) sends a computational offload request to the computational offload manager of system control processor A (614). The computational offload request specifies that compression is to be performed on a dataset with a dataset identifier included in the request.

At step 11, the computational offload manager uses the dataset identifier to identify the dataset and the dataset location associated with dataset identifier. The computational offload manager identifies that the dataset is stored in storage resource A (620) of the computational storage system (616).

At step 12, the computational manager identifies that system control processor A (614) and the computational storage system (616) are capable of performing compression as is required by the computational offload request.

At step 13, in order to minimize the movement of data, the computational offload manager selects the computational storage system (616) to perform the computational offload. In response to the selection, at step 14, the computational offload manager instructs, through the computational storage system computational offload service, the computational storage system (616) to perform compression on the dataset to satisfy the computational offload request. At step 15, in response to obtaining the instructions, the computational storage system (616) performs compression on the dataset to satisfy the computational offload request. The computational offload manager then notifies the application that the computational offload is complete.

END OF EXAMPLE

Thus, as illustrated in FIGS. 6.1-6.2, embodiments of the invention may provide a composed information handling system that includes the capability to perform computational offloads.

Figure 7:
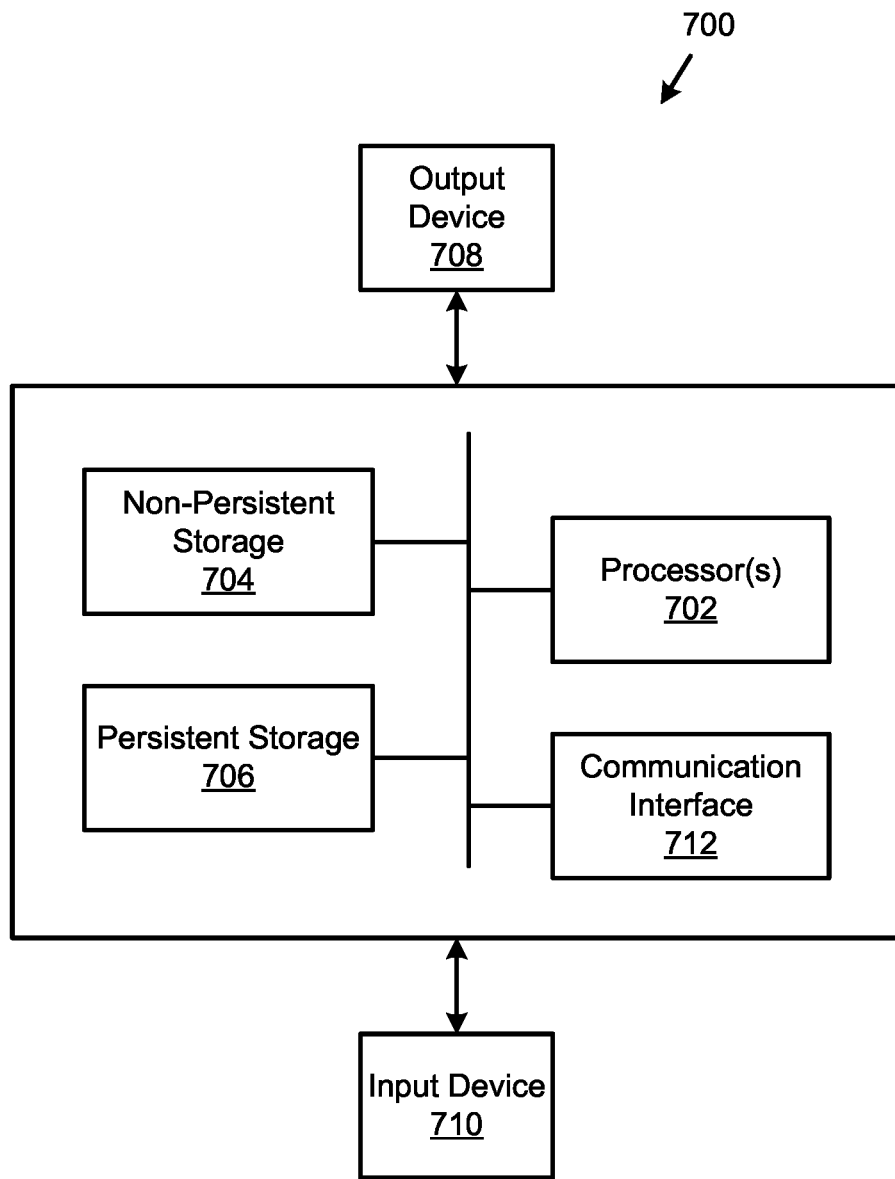
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for performing computational offloads for composed information handling systems. Specifically, embodiments of the invention may enable a system control processor manager to compose a composed information handling system to leverage hardware resources with additional computational capabilities (e.g., computational storage systems, special purpose devices, etc.) to satisfy a computational offload intent. The system control processor manager may further instruct a system control processor to instantiate a computational offload manager to discover the computational offload capabilities of the composed information handling system, instantiate any computational offload service instances associated with the composed information handling system components, and provide a computational offload interface to applications executing on the at least one compute resource set of the composed information handling system. Consequently, an application executing on the at least compute resource set of the composed information handling system may request to perform a computational offload through the computational offload interface to the system control processor without the knowledge of how the computational offload is to be performed.

In response to obtaining the computational offload request, the system control processor may select a component of the composed information handling system capable of performing the computational offload and that may minimize the data movement required to perform the computational offload. As a result, computations may be performed closer to the data, minimizing the required data movement and improving the efficiency of the resources of the composed information handling systems. Additionally, the computational offloads may be performed at any hardware resource of a composed information handling system without the knowledge of the applications that initiated the computational offloads Thus, embodiments of the invention may address the problem of inefficient use of composed information handling system to perform computations. For example, by utilizing a system control processor to manage the performance of computational offloads in hardware resources with enhanced computational capabilities, the compute resources of the applications may be available to perform other tasks. Therefore, embodiments of the invention may improve the efficiency of performing computer implemented services.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing computational offloads for composed information handling systems, comprising:
   prior to obtaining, by a system control processor associated with a composed information handling system, a computational offload request from an application executing on at least one compute resource set:
      obtaining, by a system control processor manager, a composition request for a composed information handling system associated with computational storage, wherein the composition request comprises a listing of resources to be allocated to the composed information handling system;
      in response to obtaining the composition request:
         identifying the least one compute resource set having compute resources specified by the composition request by matching the listing of resources in the composition request to the at least one compute resource using a telemetry data map;
         identifying at least one hardware resource set comprising the resource to perform the computational offload using the outcome based computing resource requirements lookup table;
         setting up the composed information handling system using at least one control resource set, the at least one compute resource set and the at least one hardware resource set,
            wherein, after setup, hardware resources in the at least one hardware resource set are presented as bare metal resources to the at least one compute resource set using the at least one control resource set to instantiate the composed information handling system to service the composition request;
            wherein setting up the composed information handling system comprises:
               performing a computational offload capabilities discovery of the at least one hardware resource set using composed information handling system data and a resource map, and
               providing, based on the computational offload capabilities discovery, a computational offload interface to the at least one compute resource set;
   obtaining, by the system control processor associated with the composed information handling system, the computational offload request associated with a dataset from the application executing on the at least one compute resource set, wherein the application uses the computational offload interface to submit the computational offload request;
   in response to obtaining the computational offload request:
      identifying a dataset location of the dataset associated with the computation offload request;
      identifying resources of the composed information handling system capable of performing the computational offload request;
      selecting a resource of the resources to perform the computational offload to minimize required movement of the dataset to perform the computational offload request; and initiating performance of the computational offload request on the selected resource.

2. The method of claim 1, wherein the computational offload request specifies:
   a computation associated with the computational offload request; and
   the dataset.

3. The method of claim 1, wherein the at least one control resource set comprises the system control processor.

4. The method of claim 1, wherein selecting the resource of the resources to perform the computational offload is based on the dataset location.

5. A non-transitory computer readable medium comprising computer readable program code, which when executed by a computer processor enables the computer processor to perform a method for performing computational for composed information handling systems, the method comprising:
   prior to obtaining, by a system control processor associated with a composed information handling system, a computational offload request from an application executing on at least one compute resource set:
      obtaining, by a system control processor manager, a composition request for a composed information handling system associated with computational storage, wherein the composition request comprises a listing of resources to be allocated to the composed information handling system;
      in response to obtaining the composition request:
         identifying the least one compute resource set having compute resources specified by the composition request by matching the listing of resources in the composition request to the at least one compute resource using a telemetry data map;
         identifying at least one hardware resource set comprising the resource to perform the computational offload using the outcome based computing resource requirements lookup table;
         setting up the composed information handling system using at least one control resource set, the at least one compute resource set and the at least one hardware resource set,
            wherein, after setup, hardware resources in the at least one hardware resource set are presented as bare metal resources to the at least one compute resource set using the at least one control resource set to instantiate the composed information handling system to service the composition request;
            wherein setting up the composed information handling system comprises:
               performing a computational offload capabilities discovery of the at least one hardware resource set using composed information handling system data and a resource map, and
               providing, based on the computational offload capabilities discovery, a computational offload interface to the at least one compute resource set;
   obtaining, by the system control processor associated with the composed information handling system, the computational offload request associated with a dataset from the application executing on the at least one compute resource set, wherein the application uses the computational offload interface to submit the computational offload request;
   in response to obtaining the computational offload request:
      identifying a dataset location of the dataset associated with the computation offload request;
      identifying resources of the composed information handling system capable of performing the computational offload request;
      selecting a resource of the resources to perform the computational offload to minimize required movement of the dataset to perform the computational offload request; and
      initiating performance of the computational offload request on the selected resource.

6. The non-transitory computer readable medium of claim 5, wherein the computational offload request specifies:
   a computation associated with the computational offload request; and
   the dataset.

7. The non-transitory computer readable medium of claim 5, wherein the at least one control resource set comprises the system control processor.

8. The non-transitory computer readable medium of claim 5, wherein selecting the resource of the resources to perform the computational offload is based on the dataset location.

9. A system for performing computational offloads for composed information handling systems, comprising:
   a system control processor manager comprising a processor and memory, is programmed to:
      prior to obtaining, by a system control processor associated with a composed information handling system, a computational offload request from an application executing on at least one compute resource set:
         obtain a composition request for the composed information handling system associated with computational storage, wherein the composition request comprises a listing of resources to be allocated to the composed information handling system;
         in response to obtaining the composition request:
            identify the least one compute resource set having compute resources specified by the composition request by matching the listing of resources in the composition request to the at least one compute resource using a telemetry data map;
            identify at least one hardware resource set comprising the resource to perform the computational offload using the outcome based computing resource requirements lookup table;
            set up the composed information handling system using at least one control resource set, the at least one compute resource set and the at least one hardware resource set,
               wherein, after setup, hardware resources in the at least one hardware resource set are presented as bare metal resources to the at least one compute resource set using the at least one control resource set to instantiate the composed information handling system to service the composition request;
               wherein setting up the composed information handling system comprises:
                  performing a computational offload capabilities discovery of the at least one hardware resource set using composed information handling system data and a resource map, and provide, based on the computational offload capabilities discovery, a computational offload interface to the at least one compute resource set;

a plurality of information handling systems, wherein the plurality of information handling systems comprise a plurality of system control processors; and a system control processor of the plurality of system control processors, comprising a processor and memory, programmed to:
- obtain the computational offload request associated with a dataset from the application executing on the at least one compute resource set, wherein the application uses the computational offload interface to submit the computational offload request;
- in response to obtaining the computational offload request:
  - identify a dataset location of the dataset associated with the computation offload request in the composed information handling system;
  - identify resources of the composed information handling system capable of performing the computational offload request;
  - select a resource of the resources to perform the computational offload to minimize required movement of the dataset to perform the computational offload request; and
  - initiate performance of the computational offload request on the selected resource.

10. The system of claim 9, wherein the computational offload request specifies:

a computation associated with the computational offload request; and the dataset.

11. The system of claim 9, wherein the at least one control resource set comprises the system control processor.

* * * * *